March 25, 1952

G. E. SOPER ET AL 2,590,472

HYDRAULIC TRANSMISSION

Filed Feb. 28, 1947

INVENTORS.
GUY E. SOPER
HANS-ERIC E. CHRISTENSON
BY
*Campbell Brumbaugh + Free*
THEIR ATTORNEYS.

Patented Mar. 25, 1952

2,590,472

UNITED STATES PATENT OFFICE 2,590,472

HYDRAULIC TRANSMISSION

Guy E. Soper, New Brunswick, and Hans-Eric E. Christenson, Florham Park, N. J., assignors to Mack Manufacturing Corporation, New York, N. Y., a corporation of Delaware Application February 28, 1947, Serial No. 731,480

15 Claims. (Cl. 74—677)

This invention relates to variable speed power transmissions and it relates particularly to improved hydro-kinetic transmissions suitable for use in vehicles and for other purposes requiring smooth automatic operation and a wide torque or speed range.

Many types of hydro-kinetic or hydraulic variable speed transmissions have been developed heretofore. Many of these transmissions include hydro-kinetic or hydraulic torque converters for varying the speed of the vehicle or other device driven thereby in relation to the speed of the motor or engine. Some of the prior devices include manually operated clutches, brakes or planetary transmissions or combinations of the same in order to effect a change in the torque ratio or the gear ratio between the engine and output shaft. Most of these transmissions are complex and, therefore, costly; and, moreover, they are not very efficient on the basis of fuel consumption.

One field for which an entirely automatic transmission is greatly to be desired is intracity buses. Such buses must start and stop at short intervals and they require frequent shifting of gears when ordinary mechanical transmissions are used therein. Such constant shifting is tiresome to the driver and, because of the jerky operation resulting from manual shifting, the buses are uncomfortable for the passengers and the action of shifting is damaging to the vehicle.

An object of the present invention is to provide an automatic hydraulic power transmission having a wide torque range and having a high torque ratio in the low speed range of the transmission.

Another object of the invention is to provide an automatic hydraulic transmission having a high torque ratio in the low speed range which renders the transmission capable of starting a heavy load from a standstill and accelerating it smoothly and efficiently to high speed.

A further object of the invention is to provide a hydraulic transmission which requires shifting only between forward and reverse drives.

An additional object of the invention is to provide a simplified hydraulic transmission by means of which fully automatic control is obtained throughout a torque range suitable for the operation of buses and other vehicles.

Still another object of the invention is to provide hydraulic transmissions in which the rotative movements in opposite directions of the turbine elements of a hydraulic torque converter are used selectively for forward and reverse operation of the output shaft of the transmission and for increasing the torque ratio of a converter.

Another object of the invention is to provide hydraulic transmissions containing gearing for transmitting rotative movements of the turbine elements in opposite directions to an output shaft, in which excessive pitchline velocities of the gears are avoided.

Other objects of the invention will become apparent from the following description of typical forms of hydraulic transmissions embodying the present invention.

In accordance with the present invention, hydraulic transmissions are provided which include a hydro-kinetic or hydraulic torque converter of the type having a driven pump or impeller rotor, a primary turbine rotor adapted to rotate in the same direction as the impeller rotor, and a reaction turbine rotor which is adapted to rotate in either direction, depending upon the torque or other forces acting on it during operation of the system. The reaction rotor and the primary turbine rotor are connected by means of a suitable gear train and an overrunning clutch whereby the torques of these rotors, when they are rotating oppositely, are combined to drive an output or driven member in one direction at a greatly increased torque ratio. As the speed of the driven member increases, the torque applied to the reaction rotor decreases until, as the speed of the impeller and primary turbine rotor approach equality, the reaction rotor will either be stopped or permitted to run free in the same direction as the primary turbine, at which time the torque converter becomes automatically a hydraulic coupling.

More particularly, in hydraulic transmissions of the type embodying the present invention the primary turbine rotor and the reaction rotor may be connected to the load through interposed gearing so that, upon operation of the pump or impeller, the load is driven in one direction. If it is desired to drive the load in the opposite direction, the load may be connected to one only of the turbine or reaction rotors.

These transmissions may include certain features which provide enhanced flexibility of operation. Thus, for example, the transmission may include a clutch mechanism that can be shifted to a neutral position whereby the output shaft may be completely uncoupled from both of the turbine rotors, thereby permitting the output shaft to rotate freely.

The transmissions may also include an overrunning clutch between the output shaft or an intermediate driven shaft so that these shafts may be coupled through the overrunning clutch to the drive shaft of the system when the driven or output shaft tends to overrun the drive shaft.

The clutching mechanisms utilized in the transmission may be simple, toothed clutches or synchronizing clutches whereby shifting of the clutch mechanism between forward and reverse drive may be accomplished by means of a power shifting mechanism.

The transmissions hereinafter described have the advantage of utilizing the forces acting on both the reaction and the primary turbine rotors for starting the vehicle or other load at an increased torque ratio and thereafter automatically bringing the output shaft up to almost the speed of the drive shaft, within the capabilities of fluid couplings, in order to obtain efficient operation throughout the entire operating range without the necessity of any manual acts on the part of the operator of the vehicle or other device other than acceleration of the engine.

For a better understanding of the present invention, reference may be had to the accompanying drawings, in which Figure 1 is a view in longitudinal section of one form of hydraulic transmission embodying the present invention, parts of the drive mechanism being omitted;

It has been recognized heretofore that if a hydraulic torque converter, having a driving impeller or pump rotor, a primary turbine rotor and a reaction turbine rotor, is so modified as to include a reversing gearing between the primary turbine rotor and the reaction rotor, a greatly increased torque ratio can be obtained, particularly when the driven or output shaft is started from a stall or standstill and accelerated toward the high speed range.

We have taken advantage of this action of a hydraulic torque converter in order to provide fully automatic transmissions which have such a wide torque range that they may be used efficiently for many different purposes, some of these transmissions being particularly suitable for use in intracity buses and the like. Such buses must be started smoothly from a stall and they must have a top speed in the vicinity of 55 miles per hour. The hydraulic transmissions described herinafter are efficient and, in addition, are so constructed that many of the elements heretofore regarded as necessary for providing suitable torque ranges and ratios referred to above may be omitted with increased efficiency of the transmission.

Figure 1:
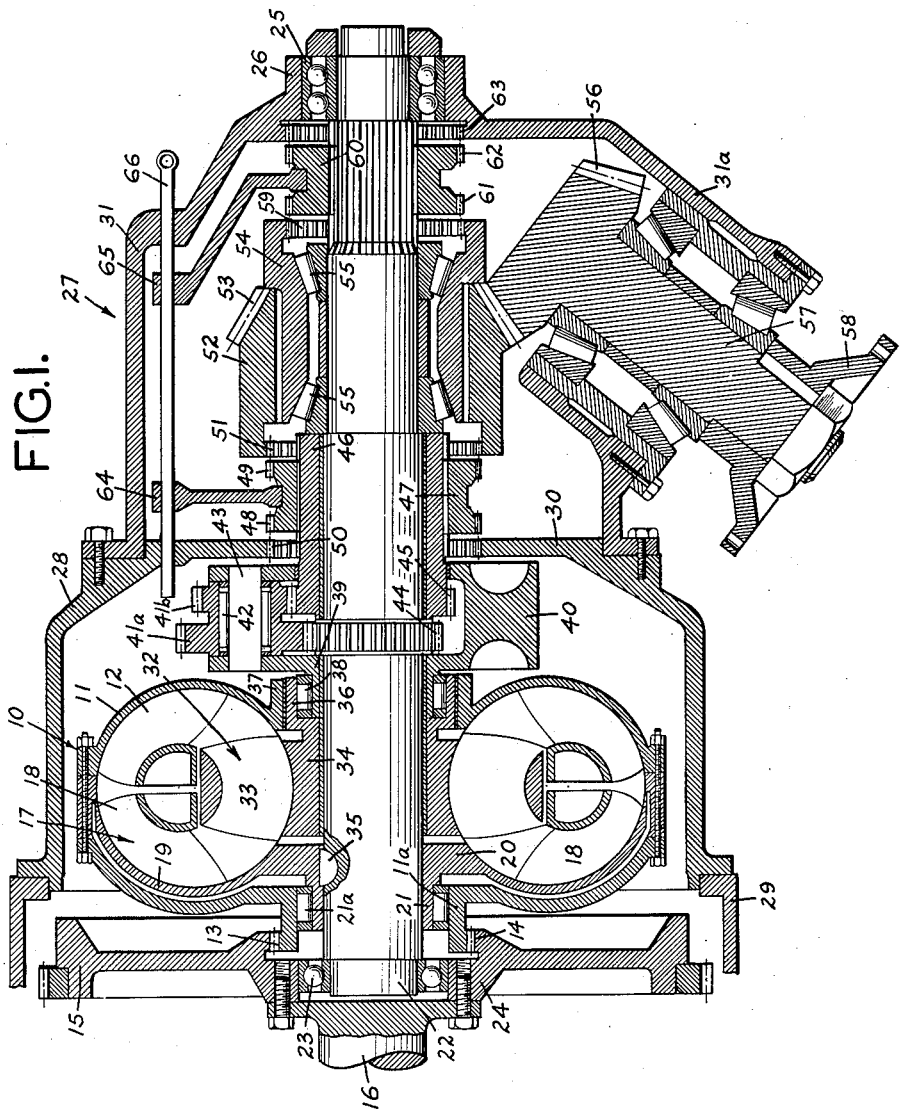

Referring now to Figure 1, one form of hydraulic transmission embodying the present invention may include a conventional type of hydro-kinetic torque converter 10, which is characterized by a generally toroidal casing 11 having pump or impeller vanes or blades 12 fixed thereto. The casing 11 may be connected by means of spline teeth 13 to the splines 14 on the flywheel 15 of an internal combustion engine or the like. The flywheel 15 is connected to the crankshaft 16 or other drive shaft so that, upon rotation of the latter, the casing 11 and the pump or impeller vanes or blades 12 of the torque converter 10 are rotated therewith.

The torque converter 10 includes a primary turbine rotor 17 having suitable vanes or blades 18 which are mounted upon an annular concave shell member 19 including a disklike portion 20 provided with a sleeve 21 that is mounted on and keyed to a driven shaft 22.

An overrunning clutch 21a is mounted between the sleeve 21 and a sleeve or collar 11a on the converter casing. This clutch locks the shaft 22 to the casing 11 when the shaft tends to overrun the casing 11 or the shaft 16.

The left-hand end of the driven shaft 22 is received in a bearing 23 which may be mounted in a hub 24 of the flywheel 15 so that the shaft 22 is centered with respect to the flywheel 15 and is coaxial with the drive shaft 16. The opposite end of the shaft 22 is mounted in a bearing 25 in a hub 26 at the end of the transmission casing 27.

The transmission casing 27 may be of any desired type. As illustrated, it includes a generally cylindrical housing member 28 which is secured to the end of the crankcase 29 of the engine and has an inwardly projecting partition or end wall 30. Secured to the wall 30 is another tapered housing section 31 of slightly smaller transverse dimensions which receives the elements connecting the transmission to the output shaft, later to be described.

Referring back to the torque converter 10, it is also provided with a reaction rotor 32 including a plurality of turbine vanes or blades 33 which are carried by a sleeve 34 that is rotatably mounted on the shaft 22. The sleeve 34 of the reaction rotor is provided with an annular collar 36 which forms an inner bearing support for a flange 37 on the casing 11. The collar 36 also forms a part of an overrunning clutch 38 whereby reverse rotation of the reaction turbine 32 drives a sleeve 39 which is rotatably mounted on the shaft 22. The sleeve 39 is a part of pinion carrier 40 which carries a plurality of sets of double pinions 41a and 41b and which rotate together and are mounted on needle or roller bearings 42 on shafts 43 carried by the pinion carrier 40.

The pinion 41a is arranged to mesh with a gear 44 fixed to a driven shaft 22 while the pinion 41b meshes with a gear 45, which is fixed to a sleeve 46 rotatably mounted on the shaft 22. The sleeve 46 carries a double ended tooth member 47 having the brake teeth 48 and the clutch teeth 49 at its opposite ends. The brake teeth 48 are adapted to engage the teeth 50 on the wall 30 to lock the sleeve 46 against rotation. The clutch teeth 49 are adapted to engage the clutch teeth 51 carried by a hub 52 provided with a bevel gear 53. The hub 52 is splined or keyed to a second sleeve 54 which is supported by means of tapered roller bearings 55 on the driven shaft 22 so that the gear 53 and the sleeve 54 may rotate relatively to the shaft 22. The two-part sleeve construction 52, 54 is provided for convenience of assembly.

The gear 53 meshes with another bevel gear 56 which is mounted on an output shaft 57 that is rotatably mounted in tapered roller bearings in an offset inclined portion 31a of the housing 31 so as to provide an angle power take-off. Such a construction is useful in many installations.

The shaft 57 may be provided with a suitable end coupling 58 whereby the output shaft may be coupled to the driven device.

Referring back to the sleeve 54, it is provided with a set of internal clutch teeth 59 for cooperation with a shiftable toothed member 60 having two sets of teeth 61 and 62 at its opposite ends. The clutch teeth 61 are adapted to mesh with the clutch teeth 59 on the sleeve 54 while the brake teeth 62 are adapted to mesh with the teeth 63 fixed to the interior of the casing 31. The member 60 is splined to the shaft 22 so that it is movable with the shaft or, when the brake teeth 62 and 63 are in engagement, it locks the shaft 22 against rotation. The two members 47 and 60 are adapted to move simultaneously in the same direction and are so moved by means of the shifter forks 64 and 65 which have their upper ends fixed to the shifter rod 66.

When the transmission is in the position illustrated in Figure 1, the output shaft 57 can rotate freely with respect to the drive shaft 16 and the driven shaft 22. The members 47 and 60 normally will be in this position when the driven device is not in use. In order to drive the device in a forward direction the shifter rod 66 is moved toward the left to engage the brake teeth 48 with the teeth 50 and to engage the clutch teeth 61 with the clutch teeth 59. In this position, the sleeve 46 is retained against rotation and the gear 45 is also retained against rotation. At the same time, the bevel gear 53 is clutched to the driven shaft 22.

When the shaft 16 is rotated, the converter casing 11 and the pump or impeller vanes 12 are driven in the same direction, with the result that torque is applied to the primary turbine element 17, tending to rotate it in the same direction as the casing 11. When a heavy load is applied to the output shaft 57, the liquid in the converter 10 reacts against the reaction rotor 32 and tends to drive it in a direction opposite to the direction of rotation of the impeller vanes 12. This rotation of the reaction turbine is transmitted through the overrunning clutch 38 to the pinion carrier 40, thereby rolling the pinion 41b around the fixed gear 45 and causing the pinion 41a to drive the gear 44 in the same direction as the shaft 22 is driven by the primary turbine rotor 17 and supplying additional torque to the shaft 22.

As indicated above, with the members 47 and 60 in the position described, the level gear 53 is coupled to the shaft 22 by means of the member 60 and, therefore, the output shaft 57 is driven in one direction.

As the load is accelerated, less reaction torque is exerted on the reaction rotor 32 and a greater proportion of the torque is exerted on the primary turbine rotor 17. As a result, the reaction turbine 32 rotates more slowly while the primary turbine rotor increases in speed. As the speed of the primary turbine rotor 17 approaches the speed of the impeller or pump rotor the kinetic energy of the liquid within the casing 11 becomes great enough to bring the reaction rotor 32 to a standstill and finally causes it to rotate in the same direction as the turbine rotor 17. At this point, the reaction rotor 32 is released from the pinion carrier 40 because of the presence of the overrunning clutch 38 and the torque converter 10 then becomes a hydraulic coupling by means of which the power supplied by the drive shaft 16 is transmitted to the driven shaft 22 and to the output shaft 57.

The above-described operations may be considered as those that take place during the forward operation of the driven device. When reverse rotation is desired, the shifter rod 66 is moved to the right until the teeth 49 of the member 47 engage the clutch teeth 51, coupling the gear 53 to the sleeve 46, and the brake teeth 62 and 63 engage, thereby locking the driven shaft 22 to the casing 31. In this position, the entire driving action is obtained through the rotation of the reaction turbine rotor 32 which acts through the overrunning clutch 38, the now fixed gear 44, the pinions 41a and 41b and the sun gear 45 to drive the sleeve 46 and the bevel gear 53 in a direction opposite to which it was driven when the members 47 and 60 were in their left-hand position. In this way, a reverse drive is obtained with the hydraulic converter 10 acting as one of a type having a fixed stator; in this case, the primary rotor 17 and driving stator 32 in a reverse direction.

Figure 2:
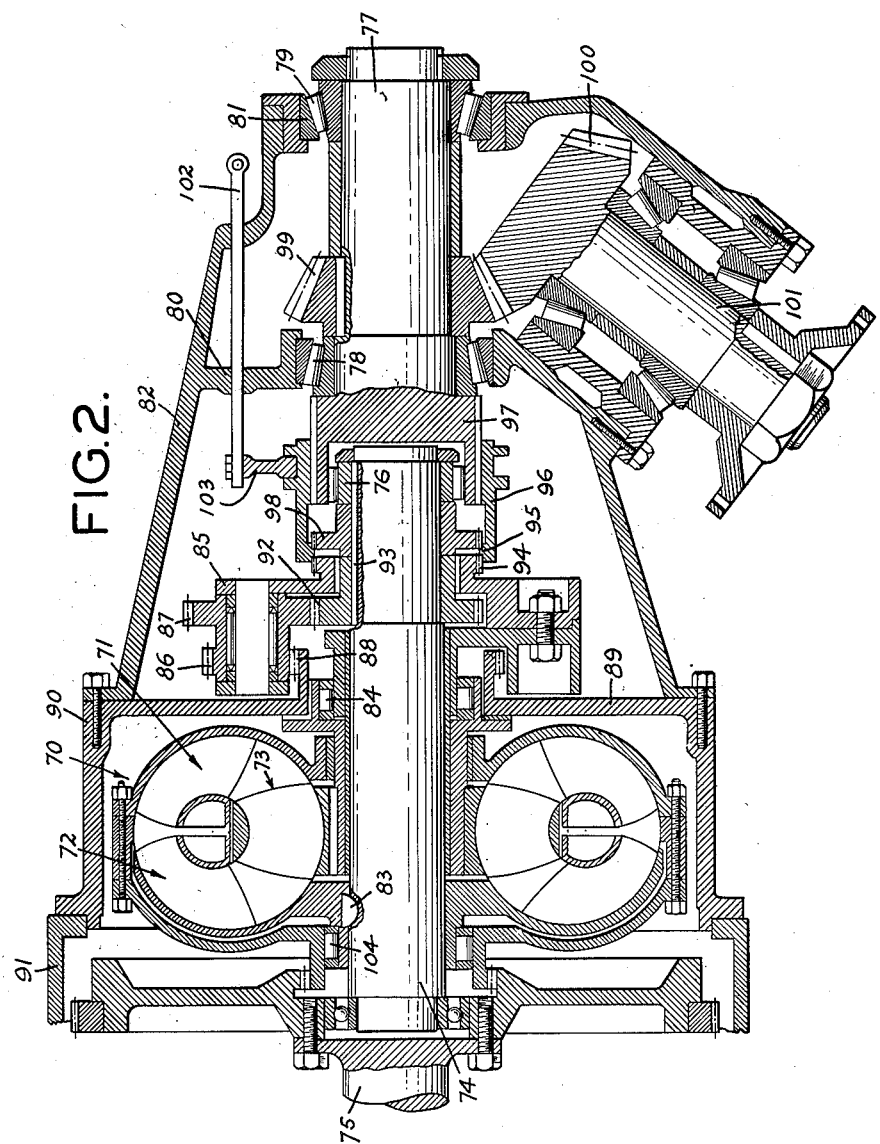
Figure 2 is a view in longitudinal section of a modied form of hydraulic transmission embodying the present invention, illustrating a different type of clutch therefor.

Hydraulic transmissions of the type described above are susceptible to considerable modification, particularly in the arrangement of the reversing gearing and the clutch mechanism therefor. A simplified form of transmission is illustrated in Figure 2. This form of device, like that disclosed in Figure 1, includes a hydrokinetic torque converter 70 having a pump or impeller rotor 71, a primary turbine rotor 72 and a reaction rotor 73 which are mounted on a driven shaft 74 and actuated by means of a drive shaft 75, as described above. In this form of device, the driven shaft 74 is mounted at its right-hand end in a roller bearing 76 which is carried by an output shaft 77, the latter being supported by means of the roller bearings 78 and 79 in webs 80 and 81 in the transmission casing 82.

The driven shaft 74 is connected by means of a key 83 to the primary turbine rotor 72 so that the shaft 74 rotates with this turbine rotor. The reaction turbine is connected by means of an over-running clutch 84 to the pinion carrier 85 which, as described before, is provided with a pair of pinions 86 and 87. The pinion 86 meshes with gear 88 fixed to the end plate 89 of the housing section 90 which is fixed to the end of the crankcase 91. The other pinion 87 of the pair meshes with a gear 92 which is connected, by means of a key 93, to the shaft 74 for rotation therewith.

The pinion carrier 85 is provided with a clutch member 94 for cooperation with the clutch member 95 carried by a sleeve 96 that is splined slidably on the end 97 of the shaft 77. Keyed on the shaft 74 is a clutch 98, also for cooperation with clutch teeth 95.

The shaft 77 is provided with a bevel gear 99 which meshes with the bevel gear 100 on the angled final driven shaft 101.

The clutch sleeve 96 may be shifted axially of the shaft portion 97 by means of a shifter rod 102 and a shifter fork 103 which engages the sleeve 96.

The clutch teeth 95 are shown in intermediate position between forward and reverse operation of the system. If the clutch teeth 95 are shifted completely into mesh with the clutch teeth 94 and out of mesh with the clutch member 98, the transmission will be in condition for reverse operation, whereby upon rotation of the drive shaft the reaction rotor 73 is driven in a reverse direction and through the overrunning clutch 84 drives the pinion carrier 85 to cause the pinion 86 to roll around the fixed gear 88. Inasmuch as the driven shaft 74 is not connected with the output shaft 77, it drives the pinion 87 and the entire transmission of power takes place directly from the planet carrier 85 through the clutch sleeve 96 to the output shaft 77, thereby driving the angled final driven shaft 101 in one direction.

If the clutch sleeve 96 is shifted to the right from the position shown to cause the teeth 95 and 98 to mesh, the output shaft 77 is coupled directly to the driven shaft 74. When the drive shaft 75 is operated, the primary turbine rotor 72 and the reaction rotor 73 are driven in opposite directions in the low speed range and, through the reversing gearing 86, 87, 88 and 92, the torques obtained from both of the turbine rotors will be combined to drive the output shaft 77. As the speed of the drive shaft 75 and the output shaft 77 increases, the action of the reaction rotor 73 varies as described above until it no longer supplies power and runs with the turbine rotor 72, as the converter 70 operates as a fluid coupling.

When it is desired to completely uncouple the output shaft 77 from the converter 70, the sleeve 96 may be shifted still further to the right until it clears the clutch member 98 and the teeth 95 are disposed in the space to the right of the clutch member 98. This uncouples the output shaft 77 from the driven shaft 74 and allows free wheeling of the system.

If it is desired to utilize the engine for braking purposes, an overrunning clutch 104 may be interposed between the turbine rotor 72 of the convertor or the driven shaft 74 and the casing of the converter 70 so that, when the shaft 74 tends to overrun the shaft 75, the overrunning clutch 104 locks them together. The overrunning clutch 104 will, of course, permit the drive shaft 75 to overrun the driven shaft 74.

Figure 3:
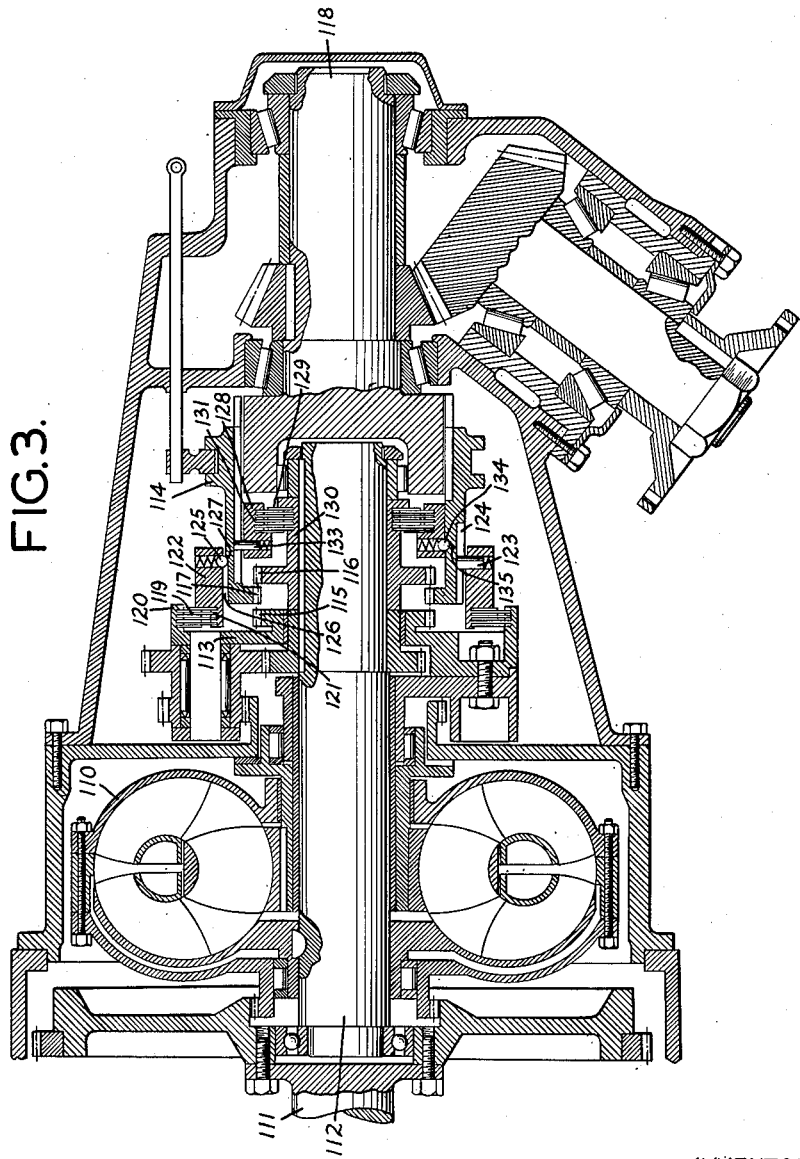
Figure 3 is a view in longitudinal section of still another form of hydraulic transmission embodying the present invention, which includes a synchronizing clutch structure.

In the transmission described above, difficulty may be encountered sometimes in shifting between the forward and reverse positions of the clutch. In order to overcome this difficulty, it may be desirable to provide the transmission with synchronizing clutches. Such a transmission is illustrated in Figure 3. In this form of transmission, the torque converter 110 is coupled to the drive shaft 111, the driven shaft 112, and to the pinion carrier 113 while the same reversing gear elements are provided between the shiftable clutch sleeve 114 and the clutch elements 115 and 116 carried respectively by the pinion carrier 113 and the driven shaft 112. A space may be provided between the clutch elements 115 and 116 of sufficient width to receive the cooperating clutch element 117 so that when it is in this intermediate position, the driven shaft 112 is not coupled to the output shaft 118.

In order to synchronize the operation of the clutch elements 115, 116 and 117, the transmission may be provided with a multiple-disk friction clutch 119 having a series of plates carried on a collar 120 on the pinion carrier 113, and another interleaved set of plates 121 carried on a sleeve 122 which is slidable axially on the exterior of the shiftable clutch sleeve 114. The sleeve 122 rotates with the clutch sleeve 114 and is connected thereto for relative axial movement by means of a spring-urged pin 123, which engages in a groove 124 in the exterior of the clutch sleeve 114. In order to provide sufficient pressure between the sets of clutch plates 120 and 121 to cause the clutch elements 115 and 117 to rotate at the same speed, the sleeve 122 is provided with a spring-urged ball 125 which engages a shoulder 127 on the sleeve 114 in such position as to engage the ball just before the clutch teeth 117 engage the clutch teeth 115. Thus, when the clutch sleeve 114 is shifted to the left, the shoulder 127 engages the ball 125 and urges the disk clutch elements 120, 121 together, thereby bringing the clutch teeth 117 and 115 to substantially the same speed of rotation. Upon additional pressure being applied to the left, the ball 125 is displaced, allowing the teeth 117 to move into mesh with the clutch teeth 115.

A similar synchronizing clutch member 128 assures proper meshing of the clutch teeth 117 and the clutch teeth 116. This clutch 128 includes a set of clutch plates 129 carried by the sleeve 130 and a second set of clutch plates 131 carried by a sleeve mounted within the clutch sleeve 114 and connected thereto by means of spring-urged pin 133 for relative axial movement.

A spring-urged ball 134 is also provided for engagement with a shoulder 135 in the interior of the clutch sleeve 114 to force the plates of the clutch 128 into engagement as the clutch sleeve 114 is moved to the right.

The above-described construction assures easy operation of the clutch sleeve 114 since the clutching operations are usually conducted with the output shaft 118 at a standstill and the driven shaft 112 being driven only slowly and without much torque by the torque converter 110.

Figure 4:
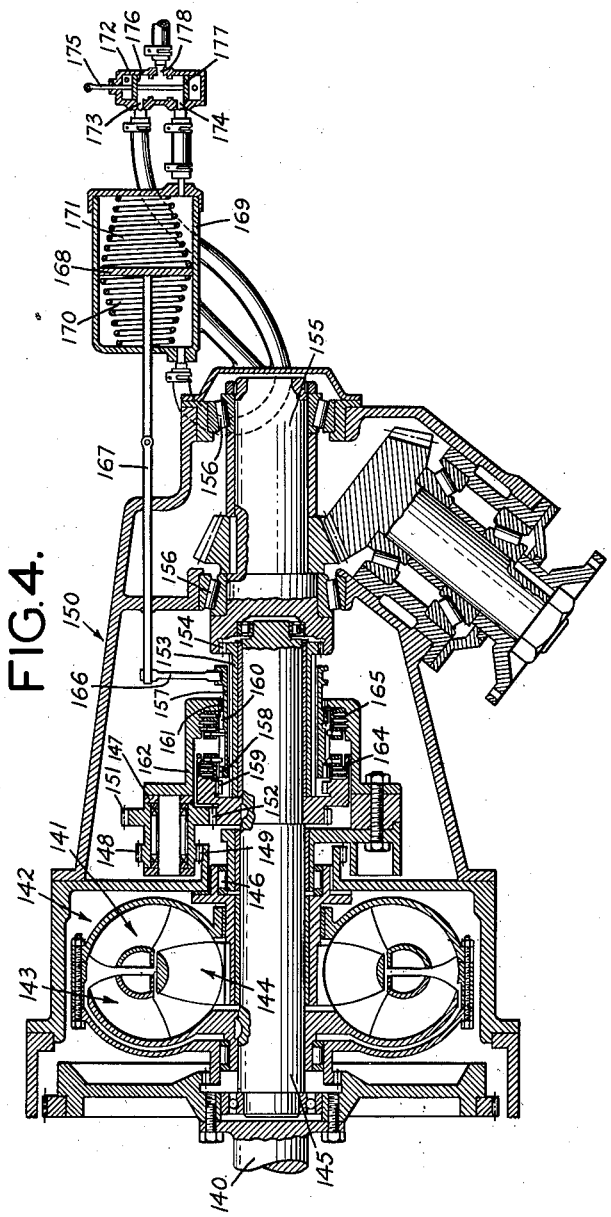
Figure 4 is a view in longitudinal section of still another form of hydraulic transmission embodying the present invention, including a power shifting mechanism for the clutches thereof.

The clutching mechanism for forward and reverse drive can be modified still further and, if desired, a power shifting mechanism may be used in the transmission, as illustrated in Figure 4. In this form of the invention, the drive shaft 140 is connected to the pump or impeller rotor 141 of the torque converter 142 which is provided with a primary turbine rotor 143 and a reaction rotor 144. The primary turbine rotor 143 is keyed to the driven shaft 145 while the reaction rotor 144 is coupled by means of the overrunning clutch 146 to the pinion carrier 147. The pinion 148 on the pinion carrier rolls on the gear 149 which is fixed to the casing 150 and the pinion 151 meshes with the gear 152 which is keyed to the driven shaft 145.

Rotatably mounted on the driven shaft 145 is a sleeve 153 having clutch teeth 154 connecting it to output shaft 155 which receives in its end one end of the driven shaft 145. The output shaft is mounted in suitable bearings 156 in the housing 150. The sleeve 153 is connected by means of splines to a shiftable clutch sleeve 157 having a set of clutch teeth 158 at its left-hand end for engagement with clutch teeth 159 carried by the gear 152. The sleeve 157 has another set of clutch teeth 160 adapted to mesh with the clutch teeth 161 on an extension 162 of the pinion carrier 147.

Interposed between the clutch sleeve 157 and each of the extensions 159 and 162 are blocking type multiple-disk friction clutches 164 and 165, like those described above, which assure synchronization of the clutch sleeve 157 either with the shaft 145 or the pinion carrier 147.

The clutch sleeve 157 may be shifted in either direction by means of a shifter fork 166 which is fixed to a shifter rod 167 and coupled to a piston 168 within a cylinder 169 mounted on the casing 150. The piston 168 is normally maintained in center position with the clutch elements 158 and 160 out of engagement with both of the clutch elements 159 and 161 by means of the springs 170 and 171 on opposite sides of the piston. Air pressure may be supplied to either side of the piston by means of the control valve 172 which has ports 173 and 174 connected by suitable couplings to the left-hand end and the right-hand end, respectively, of the cylinder 169. The valve 172 is provided with a valve stem 175 having a pair of valve plugs 176 and 177 thereon which, as illustrated, are disposed normally outward of the ports 173 and 174 and on opposite sides of the inlet port 178.

If the valve stem 175 is raised, the valve plug 177 will move into position between the ports 178 and 174, thereby causing pressure to be delivered to the left-hand end of the cylinder 169 and driving piston 168 to the right. If the valve stem 175 is depressed, a reverse operation takes place and pressure is supplied to the right-hand end of the cylinder 169, thereby driving the piston 168 to the left. Suitable venting ports are provided in the valve casing to allow air to escape from the side of the cylinder which is not being subjected to pressure. This power shifting mechanism may be modified to operate as a vacuum shift or a hydraulic system may be used.

The transmission disclosed in Figure 4 can be modified further to prolong the action of the torque converter in the lower speed ranges of the transmission and thereby obtain greater power over a more extended speed range. Such a modified transmission is disclosed in Figure 5. In this modification, the torque converter 180 is driven by means of the drive shaft 181 and the primary turbine rotor 182 drives the driven shaft 183 as described above.

The reaction turbine rotor 184 which is rotatably mounted on the shaft 183 is connected by means of two overrunning clutches 185 and 186 to the pinion carrier 187, which is substantially identical with pinion carrier 147 disclosed in Figure 4. The pinion carrier is provided with pairs of pinions 188 and 189 which mesh respectively with the stationary gear 190 and the gear 191 fixed to the shaft 183. The gear 191 is provided with the elements of the blocking type clutch 192 for cooperation with the clutch sleeve 193 which is slidably mounted and splined to the sleeve member 194. The output shaft 195 is splined to the end of the sleeve 194 so that they rotate together. A second synchronizing clutch 196 is provided between the pinion carrier 187 and the sleeve 193 in the same manner as shown in Figure 4.

The clutch sleeve 193 is shifted between forward and reverse positions by means of the motor 197 which is coupled by means of a shifter rod 198 to the shifter fork 199. The operation of the motor 197 is the same as that of the piston 168 and cylinder 169 disclosed in Figure 4 and is controlled by means of the selector valve 200. In this form of the device, the clutch sleeve 193 may be maintained normally in neutral position by means of a spring 201 mounted in a recess 202 in the housing 203 which engages a pin 204 on the shifter rod 198 and thereby normally tends to maintain it in a neutral position.

The construction described above is, therefore, almost identical with the construction shown in Figure 4 with the exception of the use of two overrunning clutches 185 and 186 between the reaction rotor 184 and the pinion carrier 187 and other structures now to be described. The overrunning clutch 185 connects the reaction rotor 184 to an intermediate sleeve 205 which, in turn, is connected through the overrunning clutch 186 to the pinion carrier 187. The sleeve 205 is provided with a disk brake element 206 which is fixed thereto and cooperates with a plane surface 207 on the partition 208 in the transmission housing 203. On the opposite side of the disk brake 206 from the partition 208 is arranged an annular piston 209 which is mounted in an annular cylinder 211 formed in a transverse partition member 213 in the housing 203. The cylinder is connected by means of a conduit 214 and passage 215 to a solenoid type control valve 216. The solenoid valve 216 includes an inlet port 217 and an outlet port 218 which is connected to the conduit 214. The valve is also provided with a valve stem 219 forming the armature of the solenoid and having a pair of valve elements 220 and 221 thereon normally disposed on opposite sides of the inlet port 217. The lower valve element 221 is movable from a position below the outlet port 218 to a position above the outlet port 218. In the lowermost position of the valve when the solenoid is energized, fluid under pressure is supplied through the port 217, the port 218 and conduit and passages 214 and 215 to the cylinder 211 to force the piston 209 against the brake member 206 and thereby prevent rotation of the intermediate sleeve 205. The solenoid circuit includes a source of electrical energy such as a battery 222, which is connected between the ground and one end of the solenoid coil 223. The other end of the coil is connected to a contact 224 by means of a conductor 225. The contact 224 is one contact of a switch 226, having another contact 227 which is grounded, and a switch blade 228 which is controlled by a centrifugal governor 229. The governor 229 may be of centrifugal ball type and is shown diagrammatically. The shaft 230 of the governor is connected by means of spiral gears 231 and 232 to the output shaft 233.

At a predetermined speed of rotation of the shaft 233, the weights of the governor 229 will be thrown out sufficiently to close the contacts 224 and 227 through the switch blade 228, thereby energizing the solenoid coil 223 and supplying pressure to the cylinder 211 to actuate the brake and prevent rotation of the sleeve 205.

Assuming that the vehicle is at a stall or standstill, upon acceleration of the drive shaft 181, the torque converter is energized with the primary turbine rotating slowly in the direction of rotation of the drive shaft and the reaction turbine rotating in the opposite direction. Such reverse rotation of the reaction turbine 184 locks the two overrunning clutches 185 and 186 so that the pinion carrier 187 is driven through the overrunning clutch 185, the intermediate sleeve 205, and the second overrunning clutch 186. In this low speed range, therefore, the shafts 195 and 233 are driven at a maximum torque ratio, thereby accelerating the vehicle. This condition exists through a speed range of about 0 to 22 miles per hour. In the range between 22 and 40 miles an hour, depending upon the setting of the governor 229, the switch 226 will close and, as a result, the brake member 206 and the sleeve 205, on which it is mounted, are locked against further rotation. The pinion carrier 187 then breaks loose from the overrunning clutch 186 and travels with the driven shaft 183. The reaction member now is locked against reverse rotation so that it acts as a stator, as in a conventional torque converter. Thus, the action of the torque converter 180 remains that of a torque converter until the vehicle or other device is accelerated beyond the speed range of 22 to 40 miles an hour. Above that range, the forces in the torque converter 180 will change so that the reaction member is no longer urged in a reverse direction but instead is urged in the same direction as the primary turbine rotor 182. When this condition is attained the reaction turbine 184 breaks loose from the intermediate sleeve 205 due to the presence of the overrunning clutch 185, and the torque converter 180 in this high-speed range then becomes fluid coupling.

The above-described construction has the advantage that the torque is multiplied by the torque converter throughout an extended range of speeds and, therefore, more efficient operation is obtained with this transmission in some types of devices.

This transmission, like the transmissions previously described, may be provided with an overrunning clutch 234 for coupling the driven shaft 183 to the drive shaft 181 when the driven shaft tends to overrun the drive shaft 181.

The above-described forms of transmissions are quite satisfactory under all conditions except for high-speed operation such as may be required in intercity bus use. The reversing gearing in these transmissions will be driven at very high pitch line velocities in the high-speed range of the transmission, thereby producing gear noises.

Figure 5:
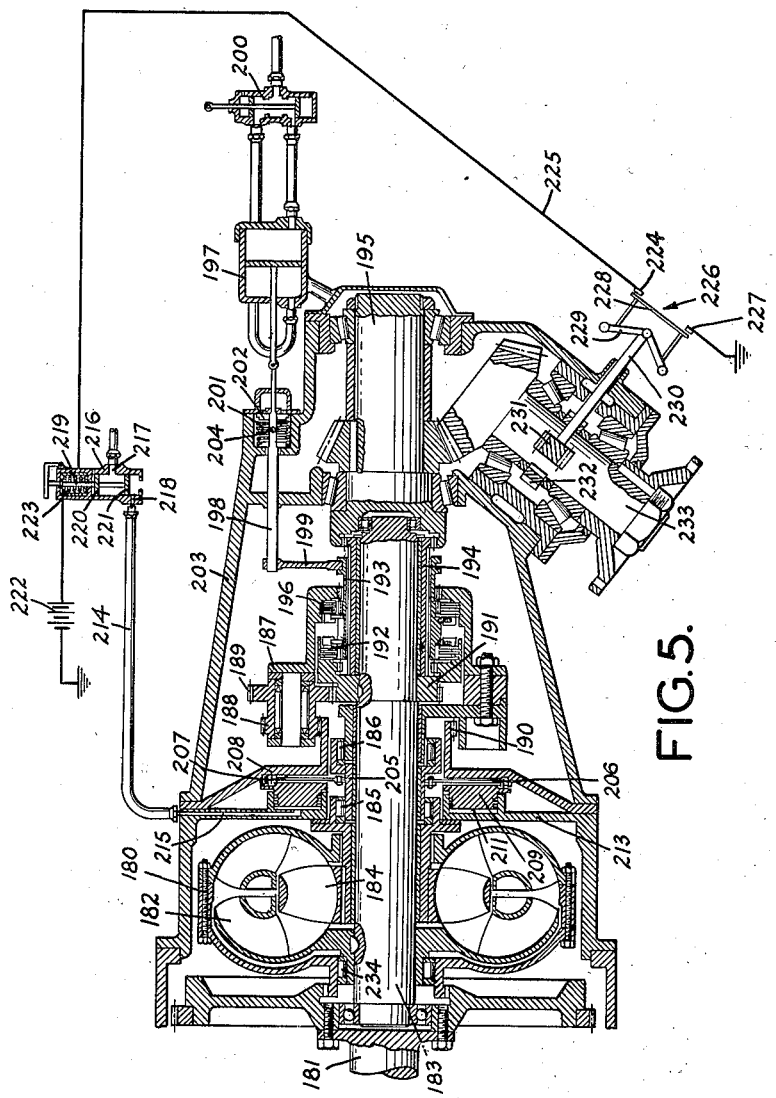
Figure 5 is a view in longitudinal section of still another form of hydraulic transmission embodying the present invention and including a governor mechanism for controlling the operation of the transmission and a power shifting mechanism for the clutches thereof.
Figure 6:
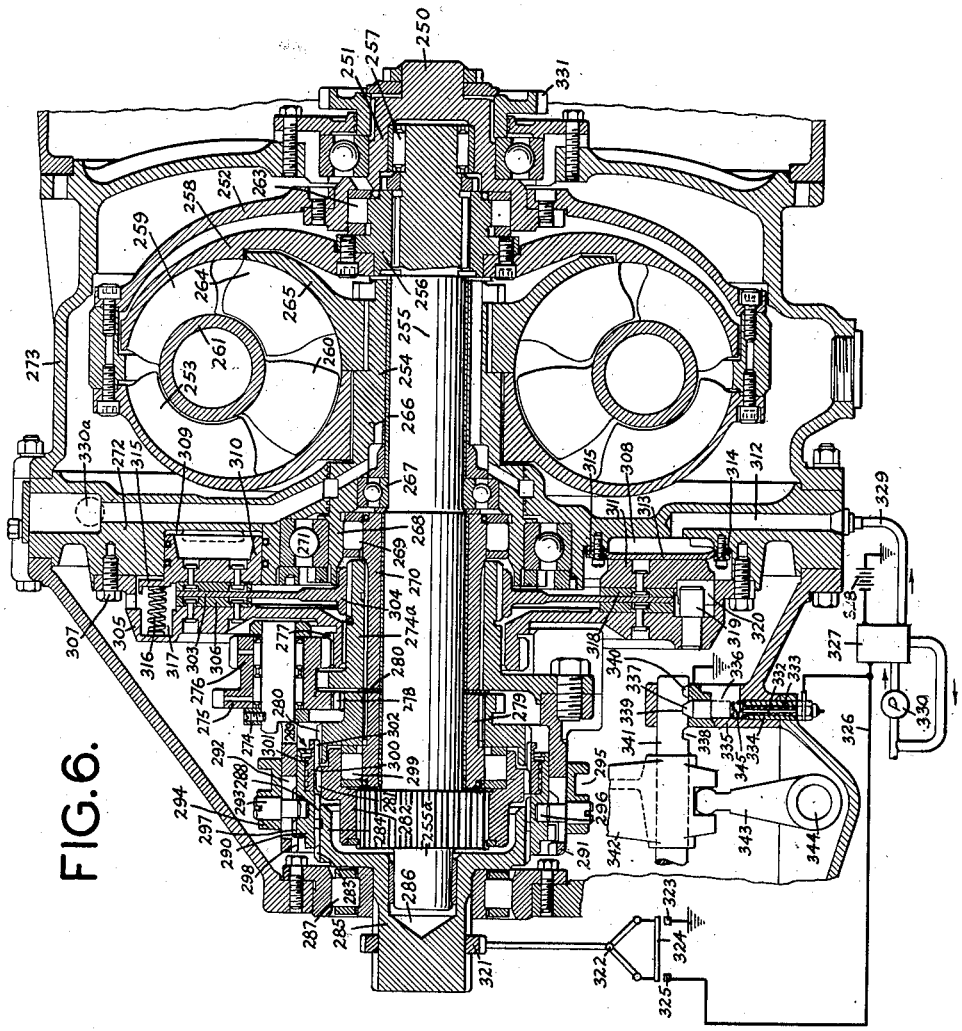
Figure 6 is a view in longitudinal section of another preferred form of transmission embodying the invention.

The form of the invention disclosed in Figure 6 overcomes the disadvantage of the transmission described above and has additional advantages. Generally, the transmission is similar to that disclosed in Figure 5, but one of the overrunning clutches has been arranged so that the reversing gearing is uncoupled from the output shaft when the device is operating in the high-speed range so that the braking mechanism holds the reversing gearing stationary and the undesirable high pitch line velocities of the gears are entirely eliminated. The brake, however, permits the reversing gearing to rotate during slow-speed operation in order to increase the torque delivery and the torque range of the transmission. The brake also serves, as described before, to stop the reaction member of the converter in the intermediate speed range in order to prolong the torque multiplying power of the converter. Moreover, the brake may be used to synchronize the output shaft with either the forwardly rotating or the counter rotating elements of the transmission which permits a directional shift or a shift into or out of neutral while the engine is idling. In addition this new arrangement of the brake reduces cavitation in the converter by stopping the counter rotating rotor before it attains high speed. Furthermore, the brake prevents the converter from operating at too low efficiency after the vehicle has been started. It has been noted that the efficiency of the converter begins to drop off rapidly when the counter rotating turbine member operates at high speed and this is overcome by suitably actuating the brake mechanism to prevent such high-speed rotation.

The converter may be of the single-stage type like those described above, but it has been found that somewhat better performance may be obtained in the low-speed range when a multi-stage converter is used in this form of transmission. Therefore, the transmission disclosed in Figure 6 is illustrated as being provided with a two-stage converter.

Referring now to Figure 6 of the drawings, the transmission includes the drive shaft 250, which may be driven by the engine as described above and has a hublike portion 251, to which the casing portion 252 of the converter is connected for rotation therewith. The casing 252 carries the impeller vanes 253 and is supported for rotation upon a sleeve 254 which is rotatably mounted on the driven shaft 255. The shaft 255 is splined to the sleeve 256 and its outermost end is supported in bearing 257 in the hub 251. The sleeve 256 is coupled to an annular dished portion 258 of the converter casing which is provided with the first and second stage turbine blades 259 and 260. These blades extend oppositely from the tubular member 261 to which they are fixed for rotation relatively to the casing portion 252.

An overrunning clutch 263 is interposed between the sleeve 256 and the hub 251 so that the driven shaft 255 will not overrun the driving shaft 250.

The reaction rotor 264 includes the dished annular casing portion 265 which, together with the casing portion 252 and the annular portion 258, forms a toroidal cavity within the converter. The casing portion 265 is splined to the sleeve 254. The sleeve 254 is supported on the shaft 255 by means of a bearing sleeve 266 and a suitable anti-friction bearing 267 which fits within a recess in the sleeve 254. The sleeve 254 is further provided with a collar 268 forming the outer race of an overrunning clutch 269 which also has an inner race sleeve 270 rotatably mounted on the driven shaft 255. The reaction turbine 264, thus, is coupled to the sleeve 270 when the reaction turbine 264 is driven in a reverse direction.

The sleeve 254 is further supported for rotation in an anti-friction bearing 271 which is mounted in a transverse partition 272 about midway of the transmission housing 273.

The sleeve 270 is splined to the hub 274a of the planet gear carrier 274 so that the planet gear carrier is rotated by the reaction rotor 264 when the latter rotates in a reverse direction.

The planet carrier 274 is provided with a pair of planet pinions 275 and 276, the latter meshing with affixed sun gear 277 carried by the partition 272. The other planet pinion 275 meshes with a sun gear 278 which is splined to a sleeve 279 that is rotatable relatively to and supported on the driven shaft 255. The sleeves 270 and 279, therefore, are relatively rotatable.

The sun gear 278 may be integral with a clutch member 280 which is axially spaced therefrom and disposed radially outwardly with respect to the sun gear 278. The clutch member 280 is in axial alignment with another clutch member 281 which has an axially extending reduced collar portion 282 that is splined to the driven shaft 255 for rotation therewith.

The clutch member 281 is also in axial alignment with a third clutch member 283 which is on the outer periphery of a drumlike element 284 that encircles the sleeve 282 and is connected to the output shaft 285. The reduced end portion 255a of the shaft 255 is journaled within the cavity 286 in the output shaft 285, the latter being supported for rotation in a suitable bearing 287 in the left-hand end of the transmission housing 273.

The various clutch elements 280, 281 and 283 cooperate with a clutch member 288 and a lockout clutch 289. The clutch 288 has internal clutch teeth complemental to the clutch teeth of the clutches 281 and 283 and comprises an annular ring member 290 which is axially slidable in a drum or sleeve member 291 that is fixed to and projects axially from the pinion carrier 274. The drum 291 is provided with a plurality of axially extending slots 292 for receiving the pins 293 extending radially inward from a shifter collar 294 which is mounted on the exterior of the drum 291 and is provided with a groove 295 for receiving the shifter fork. The pins 293 engage in a circumferential groove 296 in the exterior of the sleeve 290 so that the sleeve can rotate relatively to the drum 291 but can be shifted axially of the drum by means of the shifter collar 294.

The exterior of the sleeve 290 is provided with a set of clutch teeth 297 which cooperate with a set of clutch teeth 298 extending inwardly from the drum 291 whereby the output shaft 285 may be coupled directly to the pinion carrier 274 for rotation therewith.

As indicated above, this form of transmission is provided with another overrunning clutch which makes it possible to disconnect the output shaft 285 and the driven shaft 255 from the reversing gearing which is coupled to the reaction rotor 264. This overrunning clutch 299 is interposed between the sleeve 279 and the sleeve 282 so that the driven shaft 255 may break loose from the gearing when it tends to overrun the gearing and is locked to the gearing only when the reaction rotor 264 is positively driven in the opposite direction from the first and the second stages of the converter.

The presence of this overrunning clutch makes it necessary to provide a lockout member 289 so that the driven shaft will not be uncoupled from the reversing gearing and thus allowed to idle. This lockout clutch consists of an annular member 300 which is rotatably mounted in a recess 301 in the sleeve 290 and is provided with clutch teeth 302 of such length that they can engage both of the clutch elements 280 and 281 but can be shifted axially out of engagement with one or the other of these clutches. The purpose of the lockout clutch 289 is to overcome the change in operation produced by relocating the overrunning clutch 299. The overrunning clutch 299 engages only when the driving force is on the inner raceway or sleeve 279. Thus, when the shifting collar 294 is moved to the left to engage the clutch elements 297 and 298, the overrunning clutch would permit the driven shaft 255 to spin freely. The free spinning force comes from the fact that the outer raceway, sleeve 282, is connected with and driven by the turbine members 259 and 260 of the converter. Should the outer raceway be allowed to spin freely, it would be impossible to load up any member of the transmission so as to provide the driving force for moving the vehicle. The lockout clutch 289 is arranged to engage the clutch 281 prior to the disengagement of the clutches 281 and 288 during the shifting operation. The lockout clutch 289, in other words, locks the sleeves 279 and 282 together when the collar 294 is shifted to the left from the position shown.

This transmission, like that disclosed in Figure 5, is provided with a brake disk 303 which is carried on a sleeve 304 splined to and axially movable with respect to the sleeve 274a to cause it to rotate with the pinion carrier 274 and the reaction rotor 264.

The partition 272 of the casing 273 is provided with a braking member support 305 in the form of a disklike member which carries the sun gear 277 and is provided with a friction brake surface 306 of annular form disposed in a position to engage the disk 303. The member 305 may be secured to the partition 273 by means of machine screws 307 or any other suitable way.

The partition 272 at a zone opposite the friction surface 306 is provided with an annular groove 308 which, at spaced-apart points, communicates with cylindrical recesses 309 which are provided for receiving the pistons 310. Preferably several pistons 310 are provided for forcing rearward the annular braking ring 311 which is carried thereby and has portions overlying the groove 308. Fluid under pressure is supplied to the groove 308 and the cylinders 309 through a passage 312 which extends through the partition 272 to the exterior of the housing 273. In order to prevent leakage from the groove 308, it is provided with a flexible diaphragm or sealing strip 313 which is secured to the partition along the edges of the groove by suitable sealing rings 314 and suitable machine screws.

Referring back to the pistons 310, they, and the annular ring 311 carried by them, may be provided with radially projecting ledge members 315 which are engaged by springs 316 that are mounted within recesses 317 in the member 305 to normally urge the pistons 310 away from the brake disk 303. The surfaces of the pistons 310 and the ring 311 are provided with brake-lining material 318 for cooperation with the brake disk 303. The braking ring 311 may be retained against rotation by means of suitable pins 319 and recesses 320 mounted respectively on the member 305 and the ring 311.

The system for actuating the brake comprising the disk 303 and the piston 310 and pressure ring 311 may be similar to that disclosed in Figure 5. Thus, the output shaft 285 may be provided with a gear 321 for driving a centrifugal governor 322 for closing a circuit from ground through contact 323, governor controlled switch blade 324, contact 325, conductor 326 through the solenoid controlled valve 327 to one side of a battery 328, the other side of which is grounded. The solenoid controlled valve 327 may be the same as the valve 216 disclosed in Figure 5 or, as illustrated, it may be used for controlling liquid pressure from a pump through the conduit 329 to the passage 312. With this system the vent port of the valve is connected to the intake side of the pump 330 and the latter may be driven, for example, from the gear 331 on the right-hand end of the drive shaft 250. The pump 330 may also be used to supply liquid to the converter, if desired, through the passage 330a. When the output shaft 285 attains a certain speed, the governor controlled switch blade 324 closes a circuit through the solenoid controlled valve and pressure is supplied to the passage 308, thereby displacing the pistons 310 and the ring 311 to bring the disk 303 to a stop.

In addition, the control circuit may be provided with a branch circuit making the brake 303 effective for synchronizing the operation of the transmission when shifting from neutral into either forward or reverse or from forward or reverse into neutral. This branch circuit may include a contact member 332 which is mounted in an insulated bushing 333 extending through a bolt 334 in a boss 335 which projects into the housing 273. Slidably mounted in a bore 336 in the boss 335 is a plunger 337 which co-operates with a series of spaced notches 338, 339 and 340 on the shift rail 341 which carries the shifter fork 342. The shifter fork 342 is connected to the shifter collar 294 by the usual fork construction, not shown. The shifter fork 342 and the rod 341 may be shifted to any one of three positions by means of a lever 343 that is mounted on a shaft 344 extending from the interior to the exterior of the housing 273 and which may be rotated manually or by power means to displace the shifter rail 341.

The plunger 337 is provided with a contact 345 which engages the end of the contact 332 when the plunger 337 is displaced out of the notches 338 and 339 and 340. The casing which receives the plunger 337 may be grounded as indicated and the conductor or contact 332 is connected to the conductor 326, so that the solenoid of the valve 327 is energized to supply fluid pressure for actuating the braking mechanism at all times except when the shifter rail is in forward, neutral or reverse positions.

When the plunger 337 is in the notch 338, the transmission is in condition for forward operation. When the plunger 337 engages the notch 339, as illustrated, the transmission is in neutral and, when the plunger 337 is in the notch 340, the transmission is in reverse.

The positions of the clutch members 288 and 297, as well as the lockout clutch 289, in the various positions will now be described. When the shifter fork 342 is in position for forward operation of the transmission, the lockout clutch 289 engages only the clutch member 280 while the clutch member 288 engages both of the clutch members 283 and 281. The clutch member 297 is disengaged from the clutch member 298. In this condition, it will be seen that the reversing gearing is coupled to the clutch member 281 and the sleeve 282 through the overrunning clutch 299 so long as the reversely rotating rotor 264 tends to cause the sleeve 279 to overrun the sleeve 282. Also, the clutch member 283 on the driven shaft 285 is clutched to the clutch element 281 for driving the output shaft 285. Therefore, in the low-speed range, when the impeller 253 is rotating at a very much greater speed than the stages 259 and 260, the reversely rotating rotor 264, as well as the forwardly rotating stages 259 and 260, supply energy for driving the output shaft 285.

As the speed of the vehicle or other driven device increases to a predetermined rate and the difference in speed between the impeller 253 and the stages 259 and 260 has decreased substantially, the centrifugal governor 322 is actuated, thereby closing the circuit through the solenoid controlled valve 327. When this occurs, fluid under pressure is supplied to displace the piston 310 and the ring 311 to bring the disk 303 to a stop. When this occurs, the pinion carrier 274 is stopped as is the reversely rotating rotor 264, and this rotor therefore acts as a fixed reaction stage. The overrunning clutch 299 permits the sleeve 282 on the driven shaft 255 to break loose from the sleeve 279 and the output shaft 285 is driven only by the forwardly rotating stages 259 and 260 as they approach the speed of the impeller 253. This prolongs the action of the device as a torque converter until a sufficiently high speed is attained to cause the reaction turbine rotor 264 to rotate in the same direction as the forwardly rotating rotors 259 and 260. Inasmuch as the driven shaft 255 can break loose from the sleeve 279 and the pinion carrier 274 is retained stationary by the braking mechanism, the reversing gearing in the device is held stationary.

When the device is shifted into the reverse position, with the plunger 337 engaging the notch 340 in the shifter rail, the clutch element 288 is disengaged from the clutch element 281 and the clutch element 297 engages the clutch element 298, thereby coupling the output shaft 285 to the drum 291 and the pinion carrier 274 so that the output shaft 285 is driven by the reaction turbine member 264 in a reverse direction. At the same time, the lockout clutch member 289 engages the clutch elements 280 and 281 to render the overrunning clutch 299 ineffective. In other words, the sun gear 278 is then coupled to the driven shaft 255 so that it may be loaded up to cause the reaction member 264 to supply torque to the output shaft 285.

The auxiliary circuit including the contacts 332 and 345 is provided in order to facilitate shifting of the transmission when the engine is idling and the vehicle is stationary, such shifting being accomplished when the vehicle or other device is stationary. Ordinarily, with the engine idling, there will be a tendency for some slip to take place in the converter, with the result that the reaction rotor 264 and the forwardly rotating rotors 259 and 260 will tend to be driven when there is no load applied to them. During shifting from one position to another, the brake disk is held stationary so that both the forwardly rotating clutch member and the counter rotating clutch members 281 and 280, respectively, are brought to a stop because they are coupled by the lockout clutch member 289. If the vehicle is moving slowly or is stationary, the output shaft 285 of the transmission will be turning either at slow or at zero speed. Under these conditions, the clutch teeth 288, 281 and the clutch teeth 298 and 297 become substantially synchronized for purposes of directional shift. Some clutch drag will be encountered, however, on the clutch member 281 but this clutch drag can be overcome by beveling the ends of the clutch teeth so that, when sufficient force is applied to the shifter rail 341, the overrunning clutches will release to permit engagement of the clutch elements.

As described above, for forward operation of the device, it is desirable to set the governor 322 so that it will cause the brake to be actuated to effect a smooth changeover from the first stage of operation, in which the reaction turbine supplies energy for driving the vehicle or other device to the second stage where the reaction turbine 264 is stationary. Under most conditions, the governor will be set to actuate the brake at a vehicle speed of about 22 miles per hour.

It will be understood that all of the above-described forms of transmissions are susceptible to considerable modification and that the type of torque converter and the vane arrangement therein may be modified to obtain the best results. Also, the gear ratios in the reversing gearing described above for connecting the reaction rotor to the driven shaft may be varied, depending upon the service conditions under which the transmissions are to be used. Also, when a power shift is used for shifting between forward and reverse it is possible to use pneumatic, vacuum or hydraulic systems.

From the preceding description, it will be apparent that transmissions have been provided which are fully automatic in operation throughout a very wide range of speed ratios and that the transmissions have a sufficiently high torque ratio in the low-speed range to be useful for heavy-duty operations.

In view of the preceding description, it will be understood that the above-described forms of the invention should be considered as illustrative and not as limiting the scope of the following claims.

We claim:

1. A hydraulic transmission comprising a torque converter having a rotatable casing for receiving liquid, an impeller rotor, a turbine rotor and a reaction rotor, means for rotating said impeller rotor to rotate said turbine and reaction rotors, said turbine and reaction rotors being rotatable in opposite directions in one speed range and in the same direction in another higher speed range, a driven shaft fixed to said turbine rotor and driven thereby, a first gear fixed to said shaft, a secondary stationary gear, a pinion carrier, means including an overrunning clutch connecting said reaction rotor to said pinion carrier to drive the latter when said reaction rotor rotates oppositely to said turbine rotor, at least one pinion rotatably mounted on said pinion carrier and meshing with said first and second gears, an output shaft, a shiftable clutch for selectively connecting said driven shaft to said output shaft and for connecting said output shaft to said pinion carrier.

2. A hydraulic transmission comprising a hydraulic torque converter including an impeller rotor, and first and second turbine rotors, a driven member fixed to said first turbine rotor, a first gear fixed to said driven member, a fixed second gear, a pinion carrier rotatably mounted on said driven member, at least one pair of relatively fixed pinions mounted rotatably on said pinion carrier and meshing with said first and second gears, an overrunning clutch connecting said second turbine rotor to said pinion carrier, a sleeve member having a clutch element thereon coaxial with and shiftable axially of said driven member, and clutch elements on said pinion carrier and said driven member selectively engageable with said sleeve clutch element to drive said sleeve in forward and reverse directions.

3. A hydraulic transmission comprising a hydraulic torque converter including an impeller rotor, and first and second turbine rotors, a driven member fixed to said first turbine rotor, a first gear fixed to said driven member, a fixed second gear, a pinion carrier rotatably mounted on said driven member, at least one pair of relatively fixed pinions mounted rotatably on said pinion carrier and meshing with said first and second gears, an overrunning clutch connecting said second turbine rotor to said pinion carrier, a sleeve member having a clutch element thereon coaxial with and shiftable axially of said driven member, clutch elements on said pinion carrier and said driven member selectively engageable with said sleeve clutch element to drive said sleeve in forward and reverse directions, and means for synchronizing the rotation of said clutch elements interposed between said sleeve and said driven member and said sleeve and said pinion carrier.

4. A hydraulic transmission comprising a hydraulic torque converter including an impeller rotor, and first and second turbine rotors, a driven member fixed to said first turbine rotor, a first gear fixed to said driven member, a fixed second gear, a pinion carrier rotatably mounted on said driven member, at least one pair of relatively fixed pinions mounted rotatably on said pinion carrier and meshing with said first and second gears, an overrunning clutch connecting said second turbine rotor to said pinion carrier, a sleeve member having a clutch element thereon coaxial with and shiftable axially of said driven member, power means for shifting said sleeve axially, clutch elements on said pinion carrier and said driven member selectively engageable with said sleeve clutch element to drive said sleeve in forward and reverse directions, and means for synchronizing the rotation of said clutch elements interposed between said sleeve and said driven member and said sleeve and said pinion carrier.

5. A hydraulic transmission comprising a hydraulic torque converter having an impeller rotor and first and second turbine rotors, a driven member fixed to said first turbine rotor, a first gear fixed to said driven member, a second stationary gear, a pinion carrier having at least one pair of relatively fixed pinions rotatably mounted thereon and meshing with said first and second gears, an overrunning clutch connecting said pinion carrier to said second turbine rotor for rotation therewith in one direction of rotation of said second turbine rotor, a sleeve coaxial with, rotatable relatively to, and shiftable axially of said driven member, clutch elements on said pinion carrier and said driven member, at least one clutch element on said sleeve engageable selectively with said pinion carrier clutch element and said driven member clutch upon axial shifting of said sleeve, and an output member connected to said sleeve.

6. A hydraulic transmission comprising a hydraulic torque converter having an impeller rotor and first and second turbine rotors, a driven member fixed to said first turbine rotor, a first gear fixed to said driven member, a second stationary gear, a pinion carrier having at least one pair of relatively fixed pinions rotatably mounted thereon and meshing with said first and second gears, an overrunning clutch connecting said pinion carrier to said second turbine rotor for rotation therewith in one direction of rotation of said second turbine rotor, a sleeve coaxial with, rotatable relatively to, and shiftable axially of said driven member, clutch elements on said pinion carrier and said driven member, a clutch for releasably connecting said sleeve and said driven member in one position of said sleeve, another clutch for releasably connecting said sleeve and said pinion carrier in another axially shifted position of said sleeve, power means for shifting said sleeve axially, and an output member connected to said sleeve.

7. A hydraulic transmission comprising a drive member, an impeller connected to said drive member for rotation thereby, a turbine rotor, a reaction rotor, means enclosing said impeller and said rotors for receiving hydraulic fluid for transmitting torque from said impeller to said turbine and reaction rotors tending to cause them to rotate in opposite directions in one speed range and in the same direction in another speed range, a driven member connected to one of said rotors, reversing gearing connecting the other rotor to said driven member, braking means for stopping rotation of said other rotor in a direction opposite to said one rotor, and means for disconnecting said reversing gearing from said driven member when said other rotor is stopped.

8. A hydraulic transmission comprising a drive member, an impeller connected to said drive member for rotation thereby, a turbine rotor, a reaction rotor, means enclosing said impeller and said rotors for receiving hydraulic fluid for transmitting torque from said impeller to said turbine and reaction rotor tending to cause them to rotate in opposite directions in one speed range and in the same direction in another speed range, a driven member connected to one of said rotors, reversing gearing connecting the other of said rotors to said driven member, braking means for stopping rotation of said other rotor in a direction opposite to said one rotor and means for disconnecting said other rotor from said reversing gearing when said other rotor is stopped.

9. A hydraulic transmission comprising a drive member, an impeller connected to said drive member for rotation thereby, a turbine rotor, a reaction rotor, means enclosing said impeller and said rotors for receiving hydraulic fluid for transmitting torque from said impeller to said turbine and reaction rotor tending to cause them to rotate in opposite directions in one speed range and in the same direction in another speed range, a driven member connected to one of said rotors, reversing gearing interposed between said driven member and the other rotor, a first overrunning clutch for driving said reversing gearing when said other rotor rotates oppositely to said one rotor, a second overrunning clutch for connecting said reversing gearing to said driven member while said reversing gearing is driven by said other rotor, and braking means for stopping said reversing gearing.

10. A hydraulic transmission comprising a drive member, an impeller connected to said drive member for rotation thereby, a turbine rotor, a reaction rotor, means enclosing said impeller and said rotors for receiving hydraulic fluid for transmitting torque from said impeller to said turbine and reaction rotor tending to cause them to rotate in opposite directions in one speed range and in the same direction in another speed range, a driven member connected to one of said rotors, reversing gearing interposed between said driven member and the other rotor, and driven by the latter when said other rotor rotates oppositely to said one rotor, an overrunning clutch for connecting said reversing gearing to said driven member while the reversing gearing is driven by said other rotor, braking means for stopping said reversing gearing, an output member, clutch means for connecting said driven member and said other rotor selectively to said output member, and means for locking said overrunning clutch when said output member is connected to said other rotor.

11. A hydraulic transmission comprising a hydraulic torque converter having an impeller, means for driving said impeller to create liquid pressure, a pair of freely rotatable turbine rotors having turbine blades, the blades of the one turbine rotor being formed so that the liquid pressure creates a forwardly rotating torque, the blades of the other turbine rotor being formed so that the liquid pressure creates a counter rotating torque, a driven member, means for combining the torques of the said turbine rotors and transmitting said combined torques to said driven member so that said combined torques drive the driven member when there is a large speed difference between the impeller and said one turbine rotor, brake means for stopping the rotation of the said other turbine rotor, speed responsive means to actuate said brake to stop said other turbine rotor at predetermined speed of said driven member, and means for driving the driven member with the torque of said one turbine rotor when the second turbine rotor has been stopped and when there is a small speed difference between the impeller and said one turbine rotor.

12. A hydraulic transmission comprising a hydraulic torque converter having an impeller, means for driving said impeller to create liquid pressure, a pair of freely rotatable turbine rotors having turbine blades, the blades of one rotor being formed so that the liquid pressure creates a forwardly rotating torque, the blades of the other turbine rotor being formed so that the oil pressure creates a counter rotating torque, a for reversing the torque of the said other rotor and combining said reversed torque with the torque of the first turbine rotor, means for driving said driven member with the said combined torque when there is a large speed difference between the impeller rotor and said one turbine rotor, speed responsive means including a brake for stopping the rotation of said other turbine rotor, and means for driving the driven member with the torque of said one turbine rotor when said other turbine rotor has been stopped by said brake and when there is a small speed difference between the impeller rotor and said one turbine rotor.

13. A hydraulic transmission comprising a hydraulic torque converter having an impeller in said casing, means for rotating said impeller rotor to create liquid pressure, a pair of freely rotatable turbine rotors having turbine blades, the blades of one turbine rotor being formed so that the liquid pressure creates a forwardly rotating torque, the blades of the second turbine rotor being formed so that the oil pressure creates a counter rotating torque, a driven member, a housing for supporting the hydraulic torque converter and the driven member, means including reversing gears for reversing the torque of the second turbine rotor by reacting this torque against the said housing, means for combining the said reversed torque with the torque of said one turbine rotor, means for driving said driven member with the said combined torque when there is a large speed difference between the impeller rotor and said one turbine rotor, means including a friction brake and an overrunning clutch for stopping the rotation of said second turbine rotor, the overrunning clutch being located between the said reversing gears and the said driven member so that stopping of the second turbine rotor by said brake stops said reversing gears, means for driving the driven member with the torque of said one turbine rotor when the second turbine rotor is stopped by said brake and when there is a small speed difference between the impeller rotor and said one turbine rotor, a second overrunning clutch connecting said brake and said second turbine rotor, permitting said second turbine rotor to rotate forwardly when the speed difference between said impeller rotor and said one turbine rotor becomes sufficiently small that the oil pressure creates a forwardly rotating torque on second turbine rotor.

14. A hydraulic transmission comprising a hydraulic torque converter having an impeller in said casing, means for rotating said impeller rotor to create liquid pressure, a pair of freely rotatable turbine rotors having turbine blades, the blades of one turbine rotor being formed so that the liquid pressure creates a forwardly rotating torque, the blades of the second turbine rotor being formed so that the oil pressure creates a counter rotating torque, a driven member, a housing for supporting the hydraulic torque converter and the driven member, means including reversing gears for reversing the torque of the second turbine rotor by reacting this torque against the said housing, means for combining the said reversed torque with the torque of said one turbine rotor, means for driving said driven member with the said combined torque when there is a large speed difference between the impeller rotor and said one turbine rotor, means including a friction brake and an overrunning clutch for stopping the rotation of said second turbine rotor, said overrunning clutch being located between the said reversing gears and the said driven member so that stopping of the second turbine rotor by means of the brake stops the rotation of the said reversing gears, means for driving the driven member with the torque of said one turbine rotor when the second turbine rotor is stopped by said brake and when there is a small speed difference between the impeller rotor and said one turbine rotor, a second overrunning clutch connecting said brake and said second turbine rotor, permitting said second turbine rotor to rotate forwardly when the speed difference between said impeller rotor and said one turbine rotor becomes sufficiently small that the oil pressure creates a forwardly rotating torque on second turbine rotor, and speed responsive means for actuating said brake.

15. A hydraulic transmission comprising a torque converter having a rotatable casing for receiving liquid, an impeller rotor, a turbine rotor and a reaction rotor, means for rotating said impeller rotor to rotate said turbine and reaction rotors, said turbine and reaction rotors being rotatable in opposite directions in one speed range and in the same direction in another higher speed range, a driven shaft fixed to said turbine rotor and driven thereby, a first gear concentric with and driven by said shaft, a fixed gear concentric with said shaft, a pinion carrier rotatable relative to said turbine shaft, means including an overrunning clutch connecting said reaction rotor to said pinion carrier to drive the latter when said reaction rotor rotates oppositely to said turbine rotor, at least one pinion rotatably mounted on said pinion carrier and meshing with said first and second gears, an output shaft, and a shiftable clutch means for connecting said output shaft to said driven shaft in one shifted position of said clutch means and connecting said output shaft to said pinion carrier in another shifted position of said clutch means.

GUY E. SOPER.
HANS-ERIC E. CHRISTENSON.

REFERENCES CITED

The following references are of record in the file of this patent:

UNITED STATES PATENTS

| Number | Name | Date |
|---|---|---|
| 2,042,189 | Rabe | May 26, 1936 |
| 2,158,557 | Van Lammeren | May 16, 1939 |
| 2,205,794 | Jandasek | June 25, 1940 |
| 2,293,358 | Pollard | Aug. 18, 1942 |
| 2,302,714 | Pollard | Nov. 24, 1942 |
| 2,308,547 | Schneider | Jan. 19, 1943 |
| 2,360,646 | Carnagua | Oct. 17, 1944 |
| 2,374,303 | Osborne | Apr. 24, 1945 |
| 2,379,015 | Lysholm | June 26, 1945 |